Figure 13:
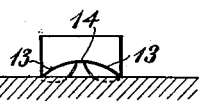

H. P. DINESEN.
BOAT.
APPLICATION FILED OCT. 26, 1909.
1,070,878.
Patented Aug. 19, 1913.
2 SHEETS—SHEET 1.
Fig. 1.
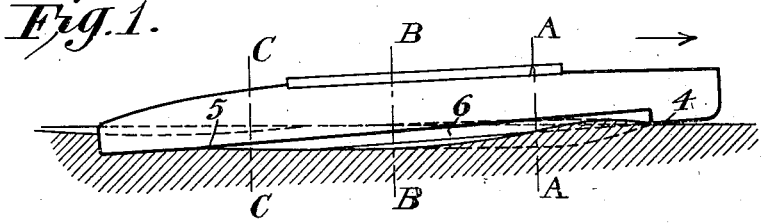
Fig. 2.
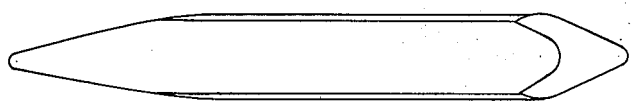
Fig. 3.  Fig. 4.  Fig. 5.
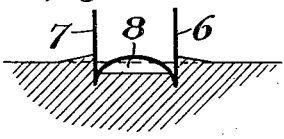 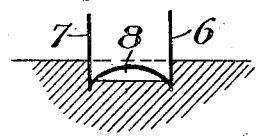 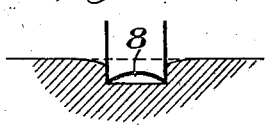
Fig. 14.
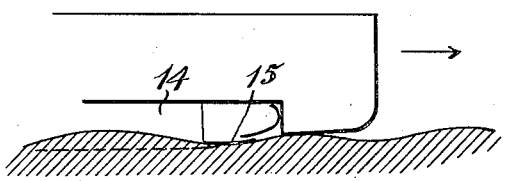
Fig. 15.
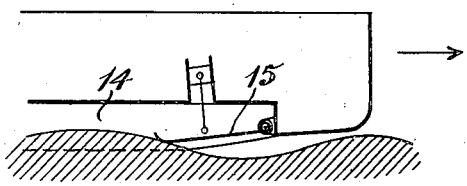
Fig. 16.
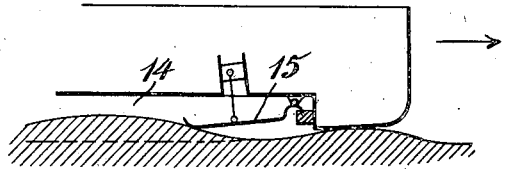
Witnesses:
John Murtagh
N. J. Murphy
Inventor:
Hans Peder Dinesen
BY Goepel Goepel
ATTORNEYS H. P. DINESEN.
BOAT.
APPLICATION FILED OCT. 26, 1909.
1,070,878.
Patented Aug. 19, 1913.
2 SHEETS—SHEET 2.
Fig. 6.
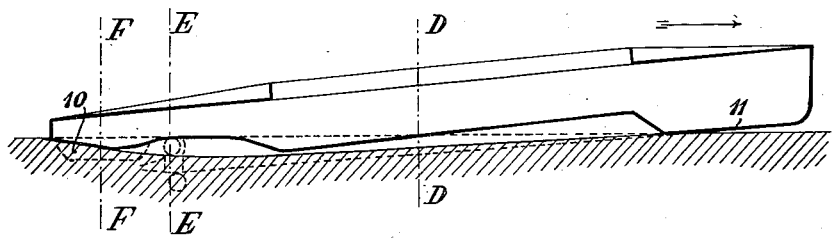
Fig. 7.
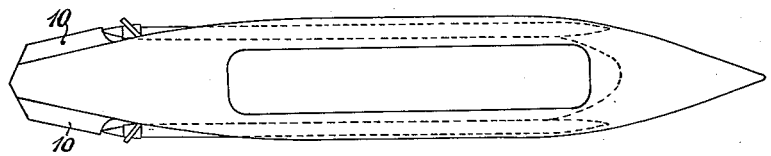
Fig. 9.   Fig. 8.   Fig. 10.
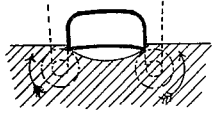 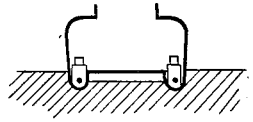 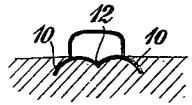
Fig. 11.
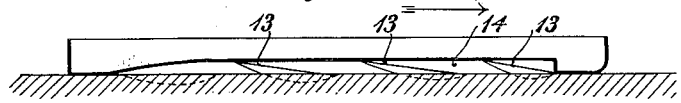
Fig. 12.
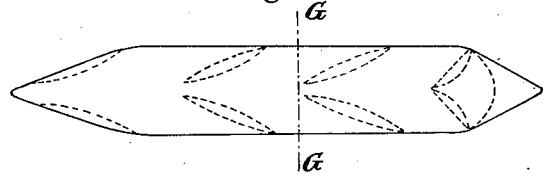

WITNESSES:
John Murtagh
J. A. Cook
INVENTOR
Hans Peter Dinesen
BY Gaspar Goepel
ATTORNEYS.

UNITED STATES PATENT OFFICE.

HANS PETER DINESEN, OF HERLÖV, DENMARK.

BOAT.

1,070,878. Specification of Letters Patent. Patented Aug. 19, 1913.

Application filed October 26, 1909. Serial No. 524,629.

*To all whom it may concern:*

Be it known that I, HANS PETER DINESEN, a subject of the King of Denmark, and residing at Herlöv, Sealand, in said Kingdom, have invented certain new and useful Improvements in Boats, of which the following is a specification.

This invention relates to boats and has for its object to reduce the resistances opposing the motion of the boat through the water.

The resistances opposing the passage of a boat through the water are principally the resistance of the friction of the water on the surface of the boat and the resistance which the water offers to the boat as the water is being displaced by the boat. There are other resistances but this invention has principally for its object the reduction of the resistance just mentioned. This is accomplished by reducing the single resistances themselves and by forcing certain resistances to neutralize each other. This is effected by placing a body of air between the water and the surface of the boat by reducing the displacement resistance and further by utilizing the movements of the water caused by the motion of the boat to help propel the same.

In the accompanying drawings in which the views are only diagrammatic, Figure 1 shows a longitudinal vertical section of one form of the invention, Fig. 2 is a bottom view of the same, Figs. 3, 4 and 5 show transverse sections taken respectively on the lines A—A, B—B and C—C of Fig. 1, Fig. 6 shows a longitudinal vertical section of a modified form of the invention, Fig. 7 is a plan of the same, Figs. 8, 9 and 10 show transverse sections taken respectively on lines D—D, E—E, and F—F of Fig. 6, Figs. 11 and 12 show a longitudinal vertical section and a plan respectively of a third form of the invention, Fig. 13 shows a transverse section on the line G—G of Fig. 12, and Figs. 14, 15 and 16 all show longitudinal vertical sections of other forms of the invention.

Referring more particularly to Figs. 1 to 5, a boat is shown provided with an air pressure chamber 8 formed by the downwardly extending bow-portion 4, stern-portion 5 and downwardly-extending sides 6 and 7 of the boat. The bottom surfaces of the stern and bow-portions 4 and 5 are inclined as shown and the stern portion terminates in a long tapering point in order to bring about the meeting of the currents of water at the stern and thus assist in propelling the boat. When the pressure of the air in the chamber 8 is properly maintained and the boat is moving at the correct speed the boat assumes the position shown in Fig. 1, the level of the water being shown by the upper part of the cross-hatched surface, and the lower edge of the projecting side 6 being shown by the dotted line.

Referring to Fig. 1, it will be seen that the air-pressure on the inner surface of the air-chamber 8 may be resolved into components tending to retard the movement of the boat and components tending to assist in the forward motion of the boat. It will be seen that the air-pressure acting on all the parts of the inner surface of the air-chamber above the level of the bottom face of the bow-portion 4 will neutralize these components while the pressure below said level will retard the boat. When the stern-portion of the boat could be maintained at the same level as the bow-portion of the boat, as shown in Fig. 11, the forward and rear-components of the air-pressure in the air-chamber would neutralize each other and the air-pressure resistance would obviously become zero. When the inner surface of water at the stern-portion is higher than the outer one, the air-pressure resistance will even become negative, that is to say, it will act not as a resistance, but assist in the forward propelling of the boat. It will be, therefore, obviously advantageous to introduce water from the outside into the air-chamber under the boat. This can be done in various ways, preferably, however, by trying to cause a movement of water from the outside inward, whereby the said movement of the water will itself be utilized for acting in the desired manner. Figs. 6 to 13 show boats in which this is done. In the boat of Figs. 6 to 10, the portions of the boat between the sides of the boat and the raised bottom each receive a motor or motors, the shafts of which are arranged in the boat parallel to the vertical center-plane of the boat, the propellers being located near the stern of the boat. The propellers are rotated in the direction of the arrows of Fig. 9 so that the blades are moved at the top from the outside toward the center of the boat. In this way water is conveyed from the outside forward under the boat and acts in the manner described before.

Fig. 10 is a cross-section on the line F—F of Fig. 6. As will be seen the oblique surfaces 10 which, on the one hand, extend from the bow to the stern, and on the other hand descend from the center of the boat outward, will be moved in the water in such a manner that a component of the water pressure will act on the surfaces so as to drive them upward, while another component (see Fig. 7) will force the water against the center of the boat's lines. In the same way, the oblique surface 11 could be provided at the bow end of the boat. As it may be difficult to get water from the stern end of the boat right to the center it is advisable to lower the bottom 12 in the center (Fig. 10) whereby the air can be inclosed at the point where the water supply from both sides becomes inadequate. The propellers will have the tendency to lower the inner water surface forward of them and to raise it slightly aft. When the propellers are properly placed, that will contribute to raising the water line at the stern end, and thus increase the action.

In the boat of Figs. 11 to 13, a number of oblique surfaces 13 are arranged under the ship, all being inclined toward the stern and toward the ship's sides. During the forward propulsion of the boat in the direction of the arrow, the pressure of the water on the oblique surfaces will bring about, on the one hand, an upward raising of the ship, and on the other hand, a movement of the water from the outside under the ship where there is air pressure in the chamber 14. In that way, it will be possible to keep the water surfaces in the chamber practically at the same level as the water outside, so that the air pressure resistance in this case can be zero or even negative.

Figs. 14 to 16 show a modified construction of the bow-portions of the boat. In case of smaller boats and in a heavy sea, it may happen that the fore part of the boat would come out above the water surface, so that the air from the chamber 14 could escape between the oblique surface and the water. A portion of the air-chamber can, therefore, be constructed with one or more adjustable or hinged plates 15, the lower edge of which edge always follows the water surface and thus prevents the air from escaping. In Fig. 14 the plate 15 is made as a plate of rubber or some other elastic material connected to the ship. In Figs. 15 and 16 the plate 15 consists of one or more hinged plates. It can be arranged to be adjustable automatically for instance, by means of a rod which passes in an air and water tight manner through the ship's bottom with a piston in an air- or liquid brake or dash-pot, or with springs for reducing the shocks during the movement. The immersed portion of the bottom at the stern-portion can be constructed in a similar manner. In Fig. 16 the front edge of the hinge plate 15 is bent downward and dips into a narrow tank filled with water and arranged transversely of the boat, so that an air tight joint is obtained by means of a water seal.

In all forms of boats some of the compressed air under the bottom will be separated and carried away by the water. This air, can, however, be replaced by any well known means.

In the foregoing description and in the claims the word "boat" should be taken to mean generally any kind of water vehicle.

I claim as my invention:—

1. A boat having its bottom formed with an open-bottomed longitudinal air-chamber, and oblique surfaces in said chamber on the bottom of the boat for raising the level of the water in the rear-part of the air-chamber.

2. A boat having its bottom formed with an open-bottomed longitudinal air-chamber extending from the bow-portion toward the stern-portion of the boat, and oblique surfaces in said chamber, said surfaces being inclined from the bow toward the stern and from the center toward the sides.

3. A boat having its bottom formed with an open-bottomed longitudinal air-chamber and a cushioned plate hinged to the front-wall of the air-chamber and provided with a downwardly-bent and water-sealed upper portion.

In testimony, that I claim the foregoing as my invention, I have signed my name in presence of two subscribing witnesses.

HANS PETER DINESEN.

Witnesses:
ERNEST BOUTARD,
P. HOFMAN-BANG.